Patented Aug. 9, 1949

2,478,417

UNITED STATES PATENT OFFICE 2,478,417

PROCESS OF RECOVERING GLYCERINE FROM FERMENTATION CONCENTRATES

Nathan M. Mnookin, Kansas City, Mo., assignor to Colgate-Palmolive-Peet Company, Jersey City, N. J., a corporation of Delaware No Drawing. Original application February 24, 1938, Serial No. 192,397. Divided and this application September 13, 1943, Serial No. 502,222

4 Claims. (Cl. 260—637)

This invention relates to methods of recovering polyhydric alcohols from impure concentrates containing them and more particularly to methods of extracting glycerine from the concentrates of fermentation processes.

Insofar as I am aware, there is no practical or economical method for the direct recovery of glycerine from concentrated glycerol-fermented mash or wort, or from distillers' slop or other concentrates. The recovery of glycerine from such materials is made difficult by reason of the presence of disproportionately large quantities of non-glycerol organic compounds and solids and by the presence of water, which tends to dilute the glycerine and to carry water-soluble impurities into it. Various procedures have hitherto proposed, but they have been throughout expensive and impractical. For example, purification and clarification processes have been proposed which depend upon the addition of large quantities of precipitants or the almost impossible salting out of the organic solids from the residual liquids, and these have proved impractical, expensive and inefficient. The methods hitherto proposed which involve the rapid evaporation of the fermented mash, wort or distillers' slop by spreading it as a film on a heated surface in a suitable drying atmosphere are expensive and decompose the glycerine to a large extent, and in consequence the glycerine yields obtained are relatively low. The methods proposed for treating the fermented material or distillers' slop with ethyl or methyl alcohol remove water with glycerine and the resulting mixture of water, alcohol and glycerine, being a strong solvent for many organic substances, carries with it a large quantity of undesirable substances, gummy materials, coloring matter, and the like. The removal of these impurities and undesirable substances from the glycerine is extremely difficult and this, together with the necessity of removing the water and alcohol, renders this process uneconomical and impractical. The processes hitherto proposed involving attempts to extract the glycerine by a solvent or solvents capable of dissolving fats are ineffective because at best they yield only a very small fraction of the glycerine present in the fermented mash and/or distillers' slop. The solvents suggested for use in accordance with such processes have been ethyl ether, chloroform, carbon tetrachloride, acetone, benzine, hydrocarbon solvents, carbon disulphide, and like solvents or any mixtures thereof.

It has also been proposed to use hot amyl alcohol to dissolve glycerine from a fermented mash or wort or from distillers' slop, it being supposed that on removing and cooling the solvent, the glycerine would be thrown out of solution. In consequence of a low glycerine removal, the process is inherently uneconomical and impractical. Furthermore, the hot amyl alcohol dissolves a large proportion of gummy material and volatile fatty acids present and the necessity for removing these impurities from the small proportion of glycerine removed adds to the cost of operation of this process.

In accordance with my invention, I have found that I can remove glycerine from concentrated glycerol-fermented mash or wort or from distillers' slop by means of the novel selective solvent extraction processes hereinafter described. The processes embodying my invention are practical and economical and secure an unusually high recovery which closely approaches the quantities of glycerine present in the concentrates of the fermentation processes. Moreover, by carrying out the processes in accordance with my invention I am able to obtain directly glycerine of high concentration and having a relatively high degree of purity; under suitable conditions sufficiently pure for technical uses without further concentration or treatment.

The processes embodying my invention are particularly adapted for removing glycerine from concentrated glycerine-containing fermentation liquids such as a glycerol-fermented mash or wort, or distillers' slop; that is, from concentrates of fermentation processes in which glycerine is produced either as the primary fermentation product or as a by-product. The processes are particularly efficient when applied to concentrates of fermentation processes employing molasses when glycerine production is the desired object of the fermentation process. For example, I may employ a mash or wort containing glycerine and dissolved organic solids and salts from the material fermented and which has been concentrated, for example, by a vacuum distillation process or the like, as hereinafter set forth, whereby ready separation of the solvent materials employed for removal of the glycerine may be effected. A material which may be used in accordance with my invention is, for example, such a concentrate formed from blackstrap molasses which has been fermented under conditions favorable for glycerine production.

Distillers' slop, as is well known, is a residual liquid left in the still after distilling off the alcohol obtained by the usual fermentation processes and contains, among other residual materials, solids from the material fermented and glycerine. The concentrated fermentation materials prepared for use in accordance herewith in general should contain at least 5% to 10% of dissolved solids (as determined by drying to constant weight at 100°–105° C.) and preferably over 10% of solids, depending to some extent upon the solvent employed. The concentration of solids may be as high as 25% to 60% solids and even higher. In general, the proportion of glycerine in such distillers' slop concentrates varies from about 0.2% to 1% in some to about 6% to 8% in others.

In accordance with my invention, I have found that glycerine may be removed from concentrated glycerine-containing fermented liquid by certain alcohols of a higher molecular weight than ethyl alcohol, and certain derivatives of relatively high molecular weight alcohols, and in particular, alcohol ethers and esters. The solvent materials which may be used in accordance with my invention are characterized by their immiscibility, either partly or almost completely, in solutions containing dissolved solids such as, for example, the concentrated glycerol-fermented mash or wort or distillers' slop. Solvents which may be used in accordance with my invention include, for example, n-butyl alcohol, benzyl alcohol, butyl lactate, n-propyl lactate, isoproyl alcohol, n-propyl alcohol, secondary butyl alcohol, isobutyl alcohol, isopropyl lactate, and glycol mono-ethers such as, for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, or mixtures of said solvents. The lower boiling of these solvents or solvent mixtures are in general preferred for use in accordance herewith.

In carrying out the processes embodying my invention, a concentrated glycerine-containing residue such as, for example, a concentrated glycerol-fermented mash or wort is mixed with about an equal volume of, for example, isopropyl alcohol, n-butyl alcohol, n-propyl lactate or any mixture thereof. The mixing is carried out as by agitation or stirring in any suitable vessel either with or without the application of heat, as desired. After thorough agitation the mixture is allowed to stand until a separation of the materials into two phases takes place. The extract phase contains the glycerine solvent or solvents and the extracted glycerine with very little or substantially no water, and the extracted phase or raffinate contains the concentrated material free from the glycerine extracted. The extract phase containing the extracted glycerine may then be removed in any desirable manner; for example, by decantation or the like. This same extraction operation may, if desired, be repeated a sufficient number of times until all or substantially all of the glycerine is removed from the concentrate. The total extracts may then be combined and the glycerine separated from the solvent or solvents in any desirable manner as, for example, by distillation or by the addition of an agent which throws out or discharges the glycerine from solution, such as, for example, isopropyl ether, dichlorethyl ether and the like.

In the formation of the two phases mentioned above the glycerine passes from the concentrate to the solvent. It is, of course, obvious that the proportion of glycerine passing from the concentrate depends in a large measure upon the degree of selectivity of the particular glycerine solvent or solvents used as well as upon the quantity of the solvent or solvents used. It is, therefore, obvious that with some solvents or certain mixtures of solvents larger amounts of glycerine may be recovered than with like amounts of other solvents or solvent mixtures. The extent of selectivity or preferential affinity for glycerine in the solvent or solvent mixtures used in accordance with my invention depends upon the nature of the solvents used. In general, I have found that if the solvent or solvents have a propyl ($C_3H_7$) radical, these solvents possess the greatest selectivity or affinity for glycerine. Thus, for example, in extracting glycerine from a concentrated glycerol-fermented mash and/or distillers' slop, the best results have been attained with, for example, isopropyl alcohol, n-propyl alcohol, isopropyl lactate, n-propyl lactate and the like.

The following examples are illustrative of the methods for removing glycerine in accordance with my invention and it is, of course, to be understood that my invention is not to be construed as limited to the specific details of the methods described.

*Example I*

350 parts by weight of blackstrap molasses in 1250 parts by weight of water, to which has been added 150 parts by weight of sodium sulphite, are fermented to completion with a yeast. The fermented mixture is distilled to remove alcohol, acetaldehyde and other volatile constituents and the residue is concentrated to about one-fifth of the original volume of the mash. The concentrated residue is mixed with about an equal volume of isopropyl alcohol and permitted to stand, whereupon a separation of phases takes place. The extract phase containing the glycerine is removed. The residue may be then extracted about three or four more times with about an equal volume of fresh solvent with each extraction and the extracts removed. The extracts, which are substantially water-free, are collected in a suitable vessel and the solvent removed therefrom by a simple distillation. About 50 parts by weight of a light, straw-colored glycerine remains in the vessel containing a relatively small per cent of impurities (including water). This is equivalent to a yield of approximately 90% of the total glycerine present in the material treated. The resulting glycerine is of sufficient purity for direct use for many technical purposes.

*Example II*

About 12,000 parts by volume of the material resulting from normal fermentation of blackstrap molasses to alcohol is concentrated under reduced pressure to about 800 parts by volume. The concentrate is mixed with about an equal volume of isopropyl alcohol and the process then continued as described in connection with Example I. After distillation of the solvent, about 125 parts by weight of a residue remains of which about 30% by weight is glycerine. This residue is of high glycerine concentration, and hence a high purity glycerine can be readily recovered therefrom with low distillation costs. The absence of many undesirable organic compounds from the extract, such as would be removed from the fermented material, for example, by ethyl or methyl alcohol, greatly improves the distillation as these impurities cause channelling, foaming, puking and like difficulties.

*Example III*

In an operation described in Example I, with the exception that the same proportional volumes of n-propyl lactate are used in lieu of the isopropyl alcohol, about 50 parts by weight of a straw-colored glycerine, containing only a very small percentage of impurities, is secured. The water content of the n-propyl lactate extract is very low.

The glycerine extracts or solutions formed by the use of solvents in accordance with the present invention contain but relatively small quantities of extracted solids such as undesirable gums, non-fermentable sugars, volatile fatty acids, salts, etc., as compared to the relatively large quantity of solids extracted from the concentrates when solvents such as methyl or ethyl alcohol are used. When methyl or ethyl alcohol or the like is mixed with a concentrate of the character set forth above in comparable proportions, an emulsified buttery mass is formed from which an aqueous-alcoholic liquid containing but part of the glycerine can be removed only incompletely and with great difficulty. The glycerine recovery in such case is but 50% to 60% of that secured when operating in accordance with the present invention, and the aqueous-alcoholic glycerine liquid contains large proportions of inorganic salts and of organic substances, some of a gummy character which renders the final recovery of the glycerine extremely difficult. When operating in accordance with the present invention, a relatively quick and clean separation of the substantially non-aqueous, glycerine-containing phase and aqueous phase takes place. The extract phase can be readily removed and the glycerine may be readily recovered therefrom. Thus about 100 parts by weight of a concentrated distillers' slop when similarly treated with the same amounts of ethyl alcohol and isopropyl alcohol produced in the former instance about 25 parts by weight of a gummy mass containing about 2 parts by weight of recoverable glycerine, and in the latter instance about 6 parts by weight of a relatively viscous liquid containing about 3 parts by weight of recoverable glycerine.

I have also found that further reductions in the quantities of undesirable gums, non-fermentable sugars, volatile organic acids, proteins, salts, etc., extracted from the concentrated glycerol-fermented mash or wort or distillers' slop by the solvents used in accordance with my invention, can be effected if the concentrate is rendered neutral or alkaline before extraction, for example, by sodium hydroxide, calcium hydroxide, calcium oxide, sodium carbonate and the like. Similarly, these alkaline salts, particularly CaO, if added to the solvent after extraction, will throw down impurities.

The following illustrates the comparative effectiveness of extracting glycerine from concentrates in accordance with my invention from a non-alkalinized concentrate and from an alkalinized concentrate:

100 parts by weight of a concentrated distillers' slop, when extracted with about an equal volume of isopropyl alcohol, gave a total extract of about 10.6 parts by weight from which about 2.8 parts by weight of glycerine was recovered. In a similar experiment wherein the concentrated distillers' slop was preliminarily alkalinized to a pH of 9 to 10, the total extract was about 5.5 parts by weight from which about 2.8 parts by weight of glycerine was recovered. By repeated extractions the yield of glycerine can be improved in each case, and in each extraction, the proportion of non-glycerine extractions from the alkalinized concentrate will be substantially less than from the original concentrate. In each case the extracted concentrate may be handled in the usual manner for the recovery of substantially all of the potash salts, as these are not affected or removed by the extraction of glycerine in accordance with the present invention.

In any of the processes described herein, the solvent or solvents may, if desired, be added in small portions and with agitation after the addition of each portion. Also, if desired, the processes described herein may be carried out continuously as, for example, by countercurrent contacting of concentrated glycerol-fermented material with the immiscible or partially immiscible solvent or solvents in any of the known countercurrent extraction apparatus. While the extraction of the glycerine from the concentrates as described above may be carried out either hot or cold as desired, and at ordinary atmospheric pressures or at pressures either above or below atmospheric, it is desirable in the instance where the removal of glycerine from a concentrated distillery slop is contemplated to employ slightly elevated temperatures in the order of about 120° to 150° F. to increase the fluidity of the concentrate and insure a steady flow of the sticky mass, especially in the countercurrent extraction treatment.

This application is a division of my application Serial No. 192,397, filed February 24, 1938, which has become abandoned.

I claim:

1. The process of recovering glycerine from a concentrate of a fermentation mash containing glycerine and inorganic salts which comprises treating said concentrate with a propyl lactate, and separating the extract from the remaining concentrate.

2. In the process of recovering glycerine from a glycerine-containing fermentation liquid concentrate, the step of treating the concentrate with n-propyl lactate to extract the glycerine.

3. In the process of recovering glycerine from a glycerine-containing fermentation liquid concentrate, the step of treating the concentrate with isopropyl lactate to extract the glycerine.

4. In the process of recovering glycerine from a distillers' slop concentrate containing glycerine and inorganic salts, the step of treating the concentrate with isopropyl lactate to extract the glycerine.

NATHAN M. MNOOKIN.

REFERENCES CITED

The following references are of record in the file of this patent:

UNITED STATES PATENTS

| Number | Name | Date |
|---|---|---|
| 1,078,580 | Guignard et al. | Nov. 11, 1913 |
| 1,092,791 | Guignard et al. | Apr. 7, 1914 |
| 1,147,767 | Laszloffy | July 27, 1915 |
| 1,193,951 | Laszloffy | Aug. 8, 1916 |

OTHER REFERENCES

Grant: "Am. Jour. Pharm.," vol. 94, page 423 (1922). (Copy in Patent Office Library).